United States Patent [19]

Whittaker

[11] 4,373,308
[45] Feb. 15, 1983

[54] HOUSING STRUCTURE UTILIZING SOLAR ENERGY

[75] Inventor: Ralph E. Whittaker, Danville, Calif.

[73] Assignee: Atlantic Richfield Company, Los Angeles, Calif.

[21] Appl. No.: 257,298

[22] Filed: Apr. 24, 1981

[51] Int. Cl.³ .................. H01L 31/04; F24J 3/02
[52] U.S. Cl. .................. 52/173 R; 126/417; 126/418; 136/248
[58] Field of Search ............... 136/246, 248, 291; 52/173 R, 200; 126/417, 418

[56] References Cited

U.S. PATENT DOCUMENTS

| | | | |
|---|---|---|---|
| 3,841,302 | 10/1974 | Falbel | 126/425 |
| 3,991,741 | 11/1976 | Northrup, Jr. et al. | 126/425 |
| 4,137,098 | 1/1979 | Field | 136/248 |

OTHER PUBLICATIONS

*Proceedings of Workshop on Solar Energy Storage Subsystems for the Heating and Cooling of Buildings,* Charlottesville, Va., Apr. 1975, p. 154.

J. W. Stultz, "Thermal and Other Tests of Photvoltaic Modules Performed in Natural Sunlight" DOE Low--Cost Solar Array Project 5105-5176 (1978), pp. 6-2, 6-3.

M. A. Duguay, "Solar Electricity: The Hybrid System Approach", *American Scientist,* vol. 65, pp. 422-427 (1977).

*Primary Examiner*—Aaron Weisstuch
*Attorney, Agent, or Firm*—Robert M. Betz

[57] ABSTRACT

A solar cell array consisting of individually rotatable elongated segments is flexibly supported beneath a translucent panel in the exterior roof of a building. A thermal solar collector is supported beneath the solar cell array for maximum utilization of the solar energy received through the roof opening.

7 Claims, 4 Drawing Figures

HOUSING STRUCTURE UTILIZING SOLAR ENERGY

BACKGROUND OF THE INVENTION

1. Field of the Invention

This invention relates to building structures and more particularly to structures in combination with solar energy utilization means.

2. Description of the Prior Art

Solar systems are now common for heating and cooling residential dwellings, and commercial or industrial structures.

It is conventional, for example, to mount modular solar thermal collectors on a flat or gabled roof. A heat transfer fluid such as water or air may be passed through tubular openings formed in a roof-mounted flat heat absorbent plate so as to collect and transmit heat energy to other areas as desired. Devices of this character are described in U.S. Pat. No. 4,020,827. In addition to such thermal solar collectors, arrays of silicon solar cells are presently constructed in modular form for roof top installation. Through the photovoltaic effect, these convert the sunlight directly into electrical energy, which may be used to drive any number of electrically powered utilization devices such as pumps, compressors, fans, furnaces, and the like.

A problem faced by such systems is their exposure to the external environment. Some environmental contaminants may be avoided by encasement of thermal solar collectors or solar cell arrays in transparent top and bottom covers. Nonetheless, it is difficult to protect completely against extreme variations in temperature and humidity. A further specific disadvantage of prior art thermal collector and photovoltaic panels is inherent in their physical construction, i.e., if they rest upon or form a part of an external roof structure, they are necessarily dependent upon and subject to roof expansion or contraction. Such changes can severely damage such panels, particularly the super-thin solar cells. Furthermore, rigid panel constructions are not designed for adequate earthquake protection in the areas such as California in which these are frequent natural phenomena.

It is therefore an object of this invention to provide a solar energy utilization construction for a residential dwelling or other structure which is substantially independent of environmental variables.

It is a further object of this invention to provide a solar powered heating and cooling means for a dwelling which includes a self-contained power source.

It is a still further object of this invention to provide a solar energy utilization system which is readily adaptable to existing roof structures without substantial modification.

It is yet a further object of this invention to provide a solar energy utilization system which, with economy of space utilization, incorporates both thermal solar collectors and photovoltaic cell arrays.

Other advantages and objects of this invention will become apparent from a consideration of the detailed description and drawings to follow taken in conjunction with the appended claims.

SUMMARY OF THE INVENTION

In accordance with this invention, an array of solar cells may be mounted beneath one or more openings in an existing external roof covered by translucent panels. A solar cell array is suspended beneath the roof in spaced-apart relation from each such translucent panel so that the light receiving surfaces of the cells normally lie in a plane parallel to that of the roof. It is desirable to construct the solar cell array in the form of a series of adjacent elongated segments extending generally in the bottom-to-top direction of a gabled roof on its southern exposure. The segments are simultaneously rotatable about their respective longitudinal axes by means of a sun-tracking motor.

Beneath the array of solar cell segments in spaced relation, there may be also supported a thermal solar collector such as a flat plate supported so as to receive heat energy passing through the solar cell array. Both the solar cell array and the thermal collector may be flexibly mounted and constructed, and tailored to fit the dimensions of any given translucent roof-top opening. Power generated by the solar cells can be made sufficient to operate a pump for circulating a heat-transfer fluid through the thermal collector, a fan for circulating hot air from an attic plenum to provide heat to other passive solar devices, and a solar tracking motor.

DETAILED DESCRIPTION OF THE PREFERRED EMBODIMENTS

Figure 1:
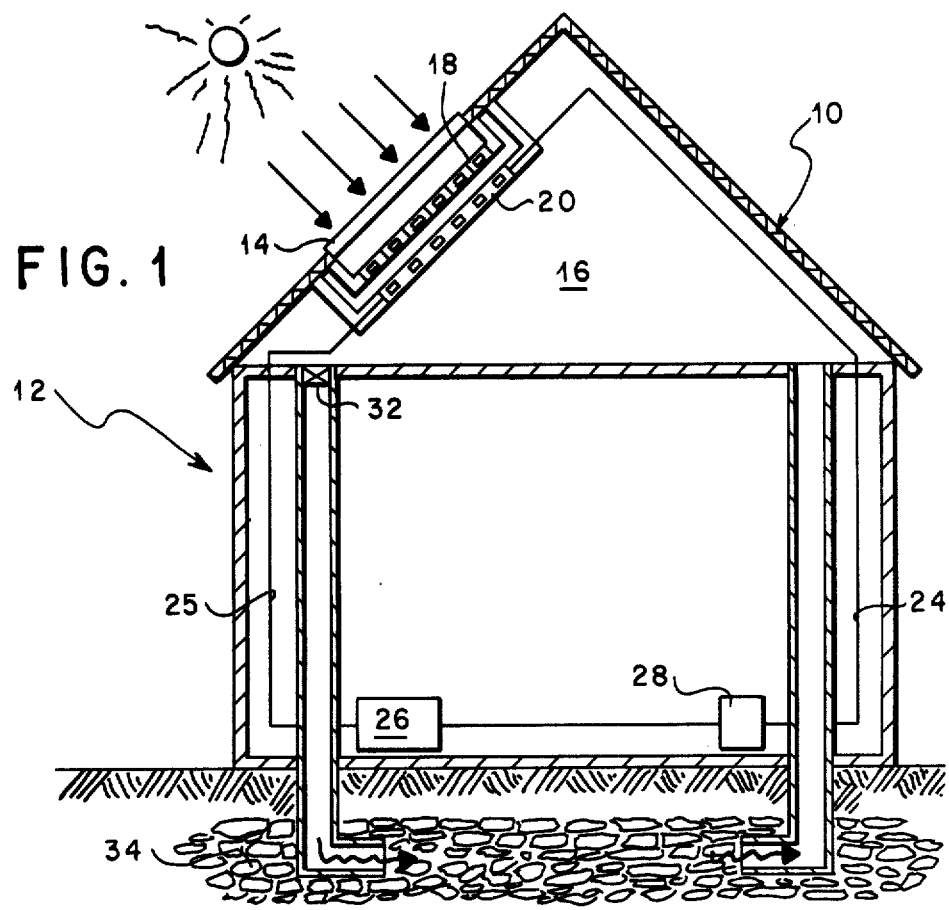
FIG. 1 is a sectional view, partly diagrammatic, of a dwelling incorporating an array of solar cell segments and a flat plate solar collector in accordance with this invention.

With reference now to FIG. 1, gabled roof 10 of dwelling 12 includes one or more translucent panels 14 which cover and seal one or more corresponding openings in roof 10. Supported in any suitable manner within attic space 16 beneath the transparent panel 14 is an array of photovoltaic solar cells 18 to be described later in further detail. Solar cell array 18 lies generally in a plane parallel to that of transparent panel 14. Beneath array 18 and in further spaced relation thereto, is a flat plate thermal solar collector 20 also supported from roof 10 in any convenient manner.

The sun's rays impinge upon and pass through panel 14 to strike the solar cells of array 18, thus providing photovoltaic energy. The heat energy passing through array 18 to flat plate collector 20 is utilized to heat a transfer fluid circulated along paths 24 and 25 to and from supply vessel 26 by means of a pump 28. Electrical energy developed by solar cell array 18 may be used to power pump 28. It may also be used to operate a fan 32 for circulating hot air from attic space 16 through a heat sink 34, such as a bed of rocks located under the dwelling 12. Finally, this electrical energy may operate a sun-tracking motor (not shown) for rotating the solar cell array 18.

Figure 2:
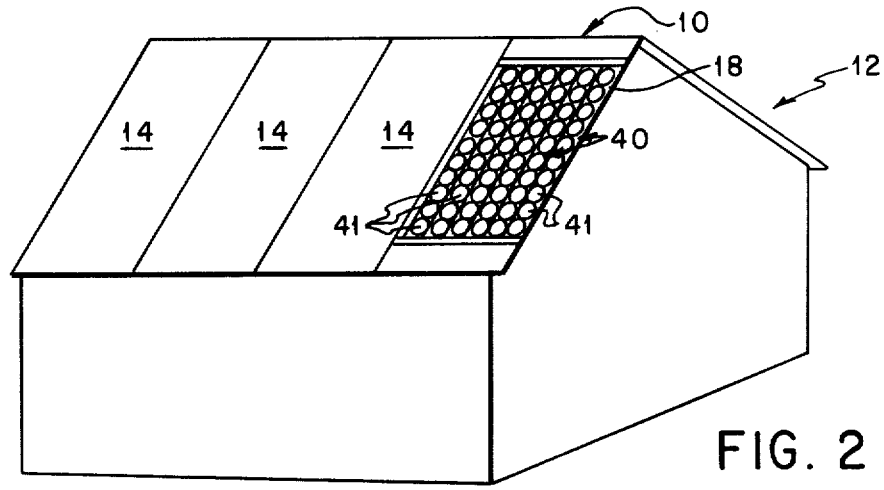
FIG. 2 is a isometric view of a dwelling with a translucent roof panel removed, illustrating the orientation of the segments of a solar cell array in accordance with this invention.
Figure 3:
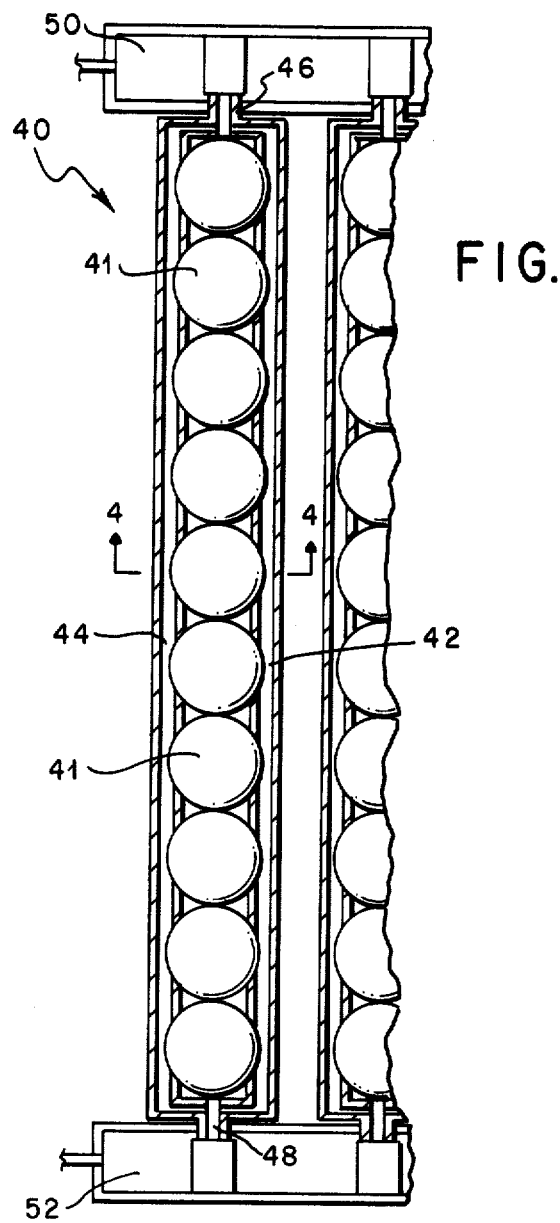
FIG. 3 is an enlarged, fragmentary, partially diagrammatic plan view of a solar cell array in accordance with this invention.

In FIG. 2 there is illustrated a plurality of transparent panels 14 incorporated within roof 10, one of such panels 14 having been removed to reveal a solar cell array 18 lying beneath the level of roof 10. With further reference to this view and to FIG. 3, the array 18 may be seen to consist of a plurality of adjacent solar cell segments 40 extending slant-wise generally in the direction of bottom to top of roof 10.

Figure 4:
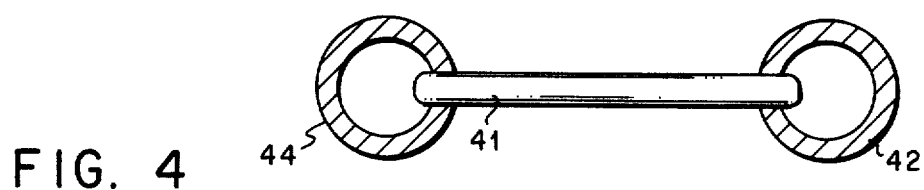
FIG. 4 is a sectional view of the solar cell array taken along line 4—4 in FIG. 3.

As best seen in FIG. 4, the cells 41 of each segment 40 are captured between a pair of conductors 42 and 44, which may be of copper or any other highly conductive material. All of the cells of a segment 40 are electrically interconnected to conductors 42 and 44 which form respectively the positive and negative leads of each segment 40. Conductors 42 and 44 are channeled longitudinally to receive a sufficient portion of the edge of each cell 41 to permit good contact (as by brazing) with the collector strips (not shown) on the opposite surfaces of each cell 41. At the upper and lower ends 46 and 48 respectively of segment 40, conductors 42 and 44 are joined to electrical harnesses 50 and 52 for power takeoff. By suitable means including, for example, worm gearing, (not shown) each segment 40 may be rotated simultaneously with the other segments 40 about their respective longitudinal axes, such as by means of a sun-tracking motor. In this way, maximum light energy is always available for capture by solar cell array 18. It should be understood, however, that within the scope of this invention it is not necessary or essential that the array 18 be so rotatable, or even that it be divided into a series of separate longitudinal segments. Furthermore, the active photovoltaic light receiving surface for each segment 40 need not consist of a series of juxtaposed or adjacent circular cells but may in fact be a continuous ribbon extending between ends 46 and 48, or some other geometrical configuration of choice. The solar collector 20 as previously described should be positioned far enough beneath solar cell array 18 (for example, several inches) to allow adequate clearance for individual segments 40 to swing or rotate to follow the sun.

The internal mounting of array 18 and collector 20 makes it unnecessary to provide a rigid frame or top and bottom covers as is the custom with regard to external roof mounted solar arrays and thermal collector modules. Solar cell sections 40 as well as their mounting means may be flexible and thus vibration-resistant. The same is true for the heat-absorbent sheet forming any of collectors 20. The invention however, is not limited to any precise construction for thermal collector 20. In fact, within the scope of this invention other configurations in addition to flat plates may be employed and sun-tracking capabilities may also be included for the thermal collector 20. As a further refinement, light-concentrating Fresnel lenses may be incorporated within translucent members 14.

To summarize, the advantages of the solar energy utilization apparatus of the invention include the following:

(a) independence of roof expansion or contraction,
(b) freedom from exposure to severe changes in external temperature in summer and winter and other environmental hazards,
(c) non-rigid construction for vibration-resistance and earthquake protection,
(d) short swing space for individually rotating solar cell segments, thus minimizing operating room requirements,
(e) simultaneous utilization of the same received solar energy for generating both electrical and thermal energy,
(f) adaptability to a fully-integrated, self-powered residential or business structure energy utilization system.

What is claimed is:

1. In a solar energy-utilizing building including: a roof and exterior walls, the improvement comprising:
   a. a translucent member covering an opening in said roof,
   b. elongated solar cell means supported within said walls, beneath said roof in spaced relation to said translucent member so as to absorb solar energy passing therethrough, said solar cell means being rotatable about its longitudinal axis, and
   c. a flat plate thermal solar collector fixedly supported in spaced relation to said solar cell means so as to absorb heat energy passing through said translucent member.

2. Apparatus as in claim 1 wherein said thermal solar collector lies beneath said solar cell means and receives thermal energy passing through said solar cell means.

3. Apparatus as in claim 1 wherein both said solar cell means and said thermal solar collector are of non-rigid construction.

4. Apparatus as in claim 3 wherein said solar cell means comprises a series of adjacent and electrically interconnected elongated solar cell segments supported beneath said roof and extending in a plane parallel to said translucent member, the cells of each such segment being provided with collector strips on opposite surfaces thereof, and further including a pair of parallel tubular conductors between which cells of each said segment are captured, said conductors forming respectively the positive and negative leads for said segments.

5. Apparatus as in claim 4 wherein said tubular conductors are channelled longitudinally to receive a sufficient portion of the edge of each said cell so as to permit good electrical contact with said collector strips.

6. Apparatus as in claim 5 wherein each of said segment consists of a single integral ribbon of photovoltaic material.

7. Apparatus as in claim 4 where said solar cell segments are simultaneously rotatable about their respective longitudinal axes.

* * * * *